(12) United States Patent
Sakaguchi

(10) Patent No.: US 9,994,685 B2
(45) Date of Patent: Jun. 12, 2018

(54) RESIN COMPOSITION

(75) Inventor: Takahiro Sakaguchi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 14/129,426

(22) PCT Filed: Jun. 27, 2012

(86) PCT No.: PCT/JP2012/066391
§ 371 (c)(1),
(2), (4) Date: Dec. 26, 2013

(87) PCT Pub. No.: WO2013/005619
PCT Pub. Date: Jan. 10, 2013

(65) Prior Publication Data
US 2014/0135426 A1 May 15, 2014

(30) Foreign Application Priority Data

Jul. 7, 2011 (JP) ................. 2011-150765
Jul. 26, 2011 (JP) ................. 2011-163026
Dec. 19, 2011 (JP) ................. 2011-277329

(51) Int. Cl.
*C08J 5/18* (2006.01)
*C08F 212/08* (2006.01)
(Continued)

(52) U.S. Cl.
CPC ............. *C08J 5/18* (2013.01); *C08F 212/08* (2013.01); *G02B 1/041* (2013.01)

(58) Field of Classification Search
CPC C08F 2220/325; C08F 212/00; C08F 212/02; C08F 212/04; C08F 212/08;
(Continued)

(56) References Cited

U.S. PATENT DOCUMENTS 3,542,739 A * 11/1970 Malamet ............... C08F 20/34
526/301
3,857,818 A * 12/1974 Frizelle .............. C08G 18/6229
525/124
(Continued)

FOREIGN PATENT DOCUMENTS

EP 2 378 362 A1 10/2011
JP A-64-010666 1/1989
(Continued)

OTHER PUBLICATIONS

Machine translation of JP H10-316663 A.*
(Continued)

*Primary Examiner* — Kregg T Brooks

(57) ABSTRACT

There is provided a resin composition including a copolymer having structural units of Formula (1), Formula (2), and Formula (3), and a solvent; or a resin composition including a copolymer having structural units of Formula (1), Formula (4), and Formula (5), and a solvent.

(1)

(Continued)

-continued (2)

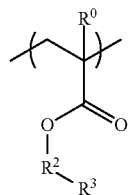

(3)

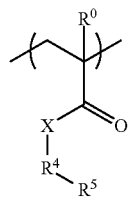

(4)

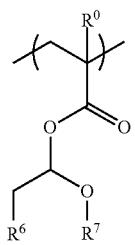

(5)

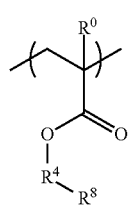

7 Claims, 1 Drawing Sheet

(51) Int. Cl.
| | |
|---|---|
| C08F 212/02 | (2006.01) |
| C08F 220/28 | (2006.01) |
| C08F 220/32 | (2006.01) |
| C08F 220/34 | (2006.01) |
| C08F 220/36 | (2006.01) |
| G02B 1/04 | (2006.01) |
| G02B 3/00 | (2006.01) |
| C08G 59/02 | (2006.01) |
| C08L 25/04 | (2006.01) |
| C08L 25/14 | (2006.01) |
| C08L 63/00 | (2006.01) |

(58) Field of Classification Search
CPC .... C08F 212/12; C08F 212/14; C08F 220/20; C08F 220/26; C08F 220/28; C08F 220/58; C08F 220/281; C08F 220/30; C08F 220/301; C08F 2220/343; C08J 5/18; C08L 33/14; C08L 25/04; C08L 25/14

See application file for complete search history.

(56) References Cited

U.S. PATENT DOCUMENTS

| | | | | |
|---|---|---|---|---|
| 4,659,795 | A | * 4/1987 | Tsutsui | C08F 220/06 526/301 |
| 2006/0210915 | A1 | 9/2006 | Takei et al. | |
| 2007/0196962 | A1* | 8/2007 | Morisue | H01L 27/12 438/149 |
| 2009/0206435 | A1* | 8/2009 | Fukuyoshi et al. | 257/432 |
| 2009/0311624 | A1 | 12/2009 | Horiguchi et al. | |
| 2010/0022090 | A1 | 1/2010 | Sakaguchi et al. | |
| 2011/0111349 | A1 | 5/2011 | Wakamatsu et al. | |

FOREIGN PATENT DOCUMENTS

| | | | |
|---|---|---|---|
| JP | A-06-112459 | | 4/1994 |
| JP | H07-5301 | A | 1/1995 |
| JP | 10316663 | A * | 12/1998 |
| JP | A-2000-275834 | | 10/2000 |
| JP | 2002-357901 | A | 12/2002 |
| JP | 2004-264623 | A | 9/2004 |
| JP | 2005-08847 | A | 1/2005 |
| JP | 2005-281445 | A | 10/2005 |
| JP | A-2010-044164 | | 2/2010 |
| JP | A-2011-081041 | | 4/2011 |
| JP | 2013-522896 | A | 6/2013 |
| KR | 10-2009-0005976 | A | 1/2009 |
| WO | WO 2005/013601 | A1 | 2/2005 |
| WO | WO 2008/026468 | A1 | 3/2008 |
| WO | WO 2008/069047 | A1 | 6/2008 |
| WO | WO 2010/007976 | A1 | 1/2010 |
| WO | WO 2010/047340 | A1 | 4/2010 |

OTHER PUBLICATIONS

Oct. 2, 2012 International Search Report issued in International Application No. PCT/JP2012/066391 (with translation).

Oct. 2, 2012 Written Opinion issued in International Application No. PCT/JP2012/066391 (with translation).

May 31, 2017 Office Action issued in Japanese Patent Application No. 2016-107582.

Jun. 8, 2017 Office Action issued in Korean Patent Application No. 10-2014-7002451.

* cited by examiner

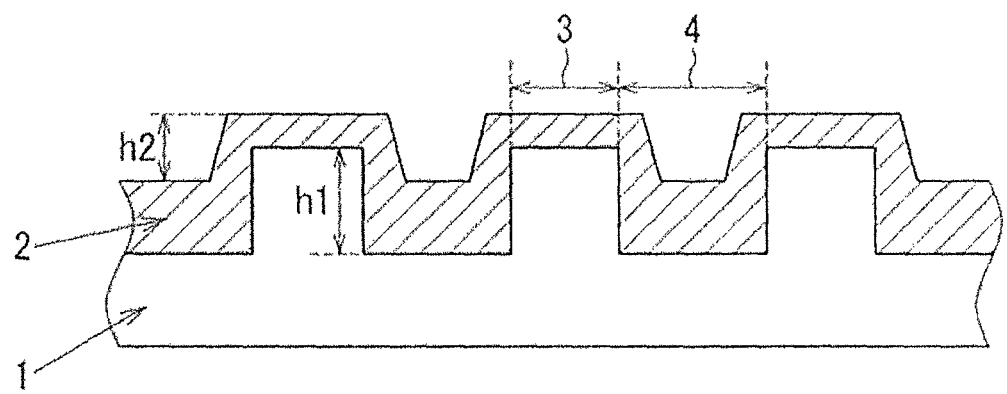

RESIN COMPOSITION

TECHNICAL FIELD

The present invention relates to a thermosetting resin composition and a cured film, a microlens, and a planarizing film formed from the resin composition.

BACKGROUND ART

In recent years, higher definition CCD/CMOS image sensors have been developed and this requires the improvement in sensitivity of the sensors. Microlenses mounted on such sensors are thus required to have high transparency and high heat resistance.

A known method for producing the microlens for a CCD/CMOS image sensor is an etch back method (Patent Document 1 and Patent Document 2). In the method, a resist pattern is formed on a resin layer for a microlens formed on a color filter layer and the resist pattern is treated with heat to be reflowed, thus affording a lens pattern. The lens pattern formed by reflowing the resist pattern is used as an etching mask and the resin layer for a microlens as the underlayer is subjected to etch back to transfer the lens pattern shape to the resin layer for a microlens, thus yielding a microlens.

In the etch back method, for the accurate transfer of a lens pattern shape to a resin layer for a microlens as the underlayer, a dry etching rate X of the resist and a dry etching rate Y of the resin layer for a microlens are required to be substantially equal (X:Y=1:0.8 to 1.2).

PRIOR ART DOCUMENTS

Patent Documents

Patent Document 1: Japanese Patent Application Publication No. 1-10666 (JP 1-10666 A)
Patent Document 2: Japanese Patent Application Publication No. 6-112459 (JP 6-112459 A)

SUMMARY OF THE INVENTION

Problem to be Solved by the Invention

The present invention was devised in view of the above, and it is an object thereof to provide a thermosetting resin composition that has excellent storage stability and can form a cured film having excellent transparency, heat resistance, solvent resistance, and flatness and having a dry etching rate substantially equal to that of a resist. Another object of the present invention is to provide a microlens having excellent transparency, heat resistance, and solvent resistance.

Means for Solving the Problem

As a result of intensive studies for solving the issues described above, the inventor of the present invention has completed the present invention.

That is, the present invention is a resin composition comprising: a copolymer having structural units of Formula (1), Formula (2), and Formula (3) or a copolymer having structural units of Formula (1), Formula (4), and Formula (5):

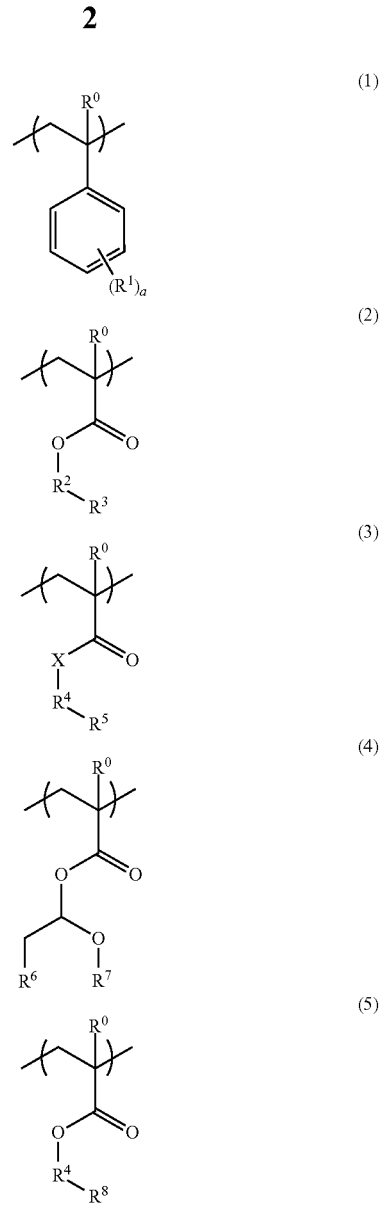

(where each of $R^0$s is independently a hydrogen atom or a methyl group; $R^1$ is a $C_{1-10}$ alkyl group, a $C_{1-10}$ alkoxy group, a cyano group, a carboxy group, a phenyl group, or a halogeno group; a is an integer of 0 to 5; $R^2$ is a single bond or a $C_{1-5}$ alkylene group; $R^3$ is a blocked isocyanate group; X is an —O— group or an —NH— group; $R^4$ is a single bond or a $C_{1-5}$ alkylene group; $R^5$ is a $C_{1-20}$ hydrocarbon group having a hydroxy group as a substituent or a phenyl group having a hydroxy group as a substituent, the $C_{1-20}$ hydrocarbon group may be a linear, a branched, or a cyclic group; $R^6$ is a hydrogen atom or a $C_{1-10}$ alkyl group; $R^7$ is a $C_{1-10}$ alkyl group, a $C_{6-10}$ cyclic hydrocarbon group, a phenyl group, a benzyl group, or a phenethyl group; where $R^6$ and $R^7$ are optionally bonded to each other to form a 4- to 7-membered oxygen-containing ring structure; and $R^8$ is an epoxy group or a $C_{5-10}$ group having an epoxy ring); and a solvent.

The resin composition of the present invention is, for example, a resin composition for a microlens or a resin composition for a planarizing film.

The present invention is a cured film obtained from the resin composition.

The present invention is a microlens produced from the resin composition. The microlens is produced by the etch back method described above, for example.

The present invention is a planarizing film produced from the resin composition.

Effects of the Invention

A resin composition of the present invention comprises a self-cross-linkable copolymer, which eliminates the necessity of adding a cross-linking agent and has thermosetting properties. The structural unit of Formula (2) has a blocked isocyanate group and the structural unit of Formula (4) has a blocked carboxy group. The resin composition thus has excellent storage stability. A film formed from the resin composition of the present invention has excellent transparency, heat resistance, solvent resistance, and flatness and has an etching rate substantially equal to that of a resist.

On this account, the film formed from the resin composition of the present invention can markedly reduce the possibilities of coloring a microlens and deforming a lens shape during a process of forming the film or a process of forming a peripheral device, such as wiring, if a heat treatment is performed at a high temperature. When the resin composition of the present invention is used to form a resin layer and a resist is applied onto the resin layer, and when a microlens or a planarizing film is formed and then a process of forming an electrode/wiring is performed, the resin composition can markedly reduce disadvantages of being mixed with the resist and of the deformation and exfoliation of the microlens or the planarizing film by an organic solvent. The resin composition of the present invention is therefore suitable for the material for forming a microlens and a planarizing film.

BRIEF DESCRIPTION OF THE DRAWINGS

FIG. 1 is a schematic view showing a cured film formed by applying a resin composition of the present invention onto a substrate with a level difference and subjecting the resin composition to baking.

MODES FOR CARRYING OUT THE INVENTION

The present invention is a resin composition comprising a copolymer and a solvent. Each component will be specifically described hereinafter. The solid content of the resin composition of the present invention except the solvent is typically 1% by mass to 50% by mass.

<Copolymer>

The copolymer comprised in the resin composition of the present invention is a copolymer having the structural units of Formula (1), Formula (2), and Formula (3) or a copolymer having the structural units of Formula (1), Formula (4), and Formula (5).

Specific examples of a compound (monomer) constituting the structural unit of Formula (1) include styrene, α-methylstyrene, 2-methylstyrene, 3-methylstyrene, 4-methylstyrene, 4-tert-butylstyrene, 4-methoxystyrene, 4-cyanostyrene, 4-vinylbenzoic acid, 4-vinylbiphenyl, 4-fluorostyrene, 4-chlorostyrene, and 4-bromostyrene. These compounds may be used singly or in combination of two or more of them. Examples of the structural unit of Formula (1) include structural units of Formula (1-1), Formula (1-2), and Formula (1-3).

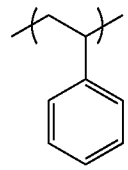

(1-1)

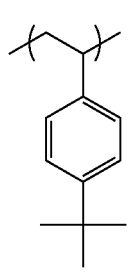

(1-2)

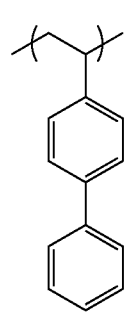

(1-3)

The structural unit of Formula (2) is composed of a (meth)acrylate having a blocked isocyanate group. The blocked isocyanate group means a group having an isocyanate group (—NCO) that is blocked with a protective group removable by heat, and the group is obtained by reacting an isocyanate group with a blocking agent.

Examples of the blocking agent include alcohols such as methanol, ethanol, isopropanol, n-butanol, 2-ethoxyhexanol, 2-N,N-dimethylaminoethanol, 2-ethoxyethanol, and cyclohexanol; phenols such as phenol, o-nitrophenol, p-chlorophenol, o-cresol, m-cresol, and p-cresol; lactams such as ε-caprolactam; oximes such as acetone oxime, methyl ethyl ketone oxime, methyl isobutyl ketone oxime, cyclohexanone oxime, acetophenone oxime, and benzophenone oxime; pyrazoles such as pyrazole, 3,5-dimethylpyrazole, and 3-methylpyrazole; thiols such as dodecanethiol and benzenethiol; and active methylene compounds such as malonic acid diester, acetoacetic acid ester, malonodinitrile, acetylacetone, methylene disulfone, dibenzoylmethane, dipivaloylmethane, and acetone dicarboxylic acid diester.

Specific examples of a compound (monomer) constituting the structural unit of Formula (2) include a compound obtained by adding a blocking agent such as methyl ethyl ketone oxime, ε-caprolactam, 3,5-dimethylpyrazole, and diethyl malonate to an isocyanate-containing (meth)acrylate such as 2-isocyanate ethyl methacrylate and 2-isocyanate ethyl acrylate. These compounds may be used singly or in combination of two or more of them.

The structural unit of Formula (2) is, for example, represented by Formula (2-1) or Formula (2-2):

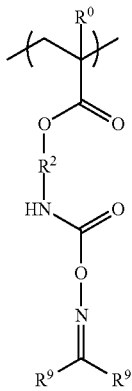

(2-1)

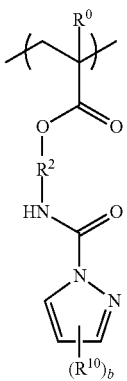

(2-2)

(where each of $R^0$s is independently a hydrogen atom or a methyl group; each of $R^2$s is independently a single bond or a $C_{1-5}$ alkylene group; each of two $R^9$s is independently a hydrogen atom, a methyl group, or an ethyl group; $R^{10}$ is a methyl group; and b is an integer of 0 to 3).

The structural unit of Formula (3) is, for example, represented by Formula (3-1):

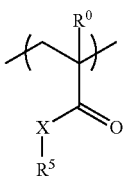

(3-1)

(where each of $R^0$s is independently a hydrogen atom or a methyl group; X is an —O— group or an —NH— group; $R^5$ is a $C_{1-20}$ hydrocarbon group having a hydroxy group as a substituent or a phenyl group having a hydroxy group as a substituent; and the $C_{1-20}$ hydrocarbon group may be a linear, a branched, or a cyclic group).

Examples of the $C_{1-20}$ hydrocarbon group having a hydroxy group as a substituent include a hydroxymethyl group, a 2-hydroxyethyl group, a 2-hydroxypropyl group, a 2-hydroxybutyl group, a 3-hydroxy-1-adamantyl group, a 2,3-dihydroxypropyl group, and a 3,5-dihydroxy-1-adamantyl group.

Specific examples of a compound (monomer) constituting the structural unit of Formula (3) include 2-hydroxyethyl (meth)acrylate, 2-hydroxypropyl(meth)acrylate, 2-hydroxybutyl(meth)acrylate, 3-hydroxy-1-adamantyl(meth)acrylate, 2,3-dihydroxypropyl(meth)acrylate, 3,5-dihydroxy-1-adamantyl(meth)acrylate, 4-hydroxyphenyl(meth)acrylate, 4-hydroxyphenylmethyl(meth)acrylate, N-(hydroxymethyl)(meth)acrylamide, N-(2-hydroxyethyl)(meth)acrylamide, N-(4-hydroxyphenyl)(meth)acrylamide, and N-(4-hydroxyphenylmethyl)(meth)acrylamide. These compounds may be used singly or in combination of two or more of them.

In the present specification, (meth)acrylate means methacrylate or acrylate; (meth)acrylamide means methacrylamide or acrylamide; and (meth)acrylic acid means acrylic acid or methacrylic acid.

The copolymer having structural units of Formula (1), Formula (2), and Formula (3) contains: the structural unit of Formula (1) in an amount of 20% by mol to 90% by mol and preferably of 30% by mol to 80% by mol; the structural unit of Formula (2) in an amount of 5% by mol to 75% by mol and preferably of 10% by mol to 60% by mol; and the structural unit of Formula (3) in an amount of 5% by mol to 75% by mol and preferably of 10% by mol to 60% by mol, with respect to the total amount of 100% by mol of the structural unit of Formula (1), the structural unit of Formula (2), and the structural unit of Formula (3).

A compound (monomer) constituting the structural unit of Formula (4) is obtained by a method of polymerizing an acrylate or a methacrylate having a protected carboxy group that is obtained by reacting acrylic acid or methacrylic acid with an alkenyl ether compound or a method of reacting a polymer of acrylic acid or methacrylic acid with an alkenyl ether compound.

The alkenyl ether compound used here is represented by Formula (6).

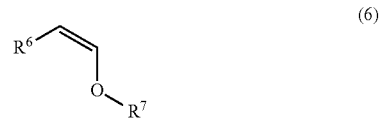

(6)

(In Formula, $R^6$ is a hydrogen atom or a $C_{1-10}$ alkyl group, and $R^7$ is a $C_{1-10}$ alkyl group, a $C_{6-10}$ cyclic hydrocarbon group, a phenyl group, a benzyl group, or a phenethyl group, where $R^6$ and $R^7$ may be bonded to each other to form a 4- to 7-membered oxygen-containing ring structure.)

The compound having a carboxy group and the alkenyl ether compound can be reacted by, for example, stirring the compounds at 70° C. with monooctyl phosphate, which is one of phosphoric acid esters, used as a catalyst, as described in Japanese Patent No. 3042033.

Examples of the alkenyl ether compound of Formula (6) include aliphatic vinyl ether compounds such as methyl vinyl ether, ethyl vinyl ether, n-propyl vinyl ether, isopropyl vinyl ether, n-butyl vinyl ether, tert-butyl vinyl ether, n-hexyl vinyl ether, cyclohexyl vinyl ether, 2-ethylhexyl vinyl ether, norbornyl vinyl ether, 1-adamantyl vinyl ether, and 2-adamantyl vinyl ether; aryl vinyl ether compounds such as phenyl vinyl ether; aralkyl vinyl ether compounds such as benzyl vinyl ether and phenethyl vinyl ether; and cyclic vinyl ether compounds such as 2,3-dihydrofuran, 4-methyl-2,3-dihydrofuran, and 2,3-dihydro-4H-pyran.

The structural unit of Formula (4) is, for example, represented by Formula (4-1) or Formula (4-2):

(4-1)

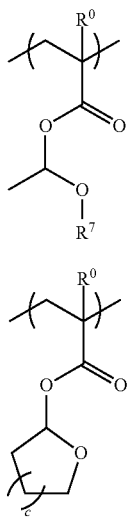

(4-2)

(where each of $R^0$s is independently a hydrogen atom or a methyl group; $R^7$ is a $C_{1-10}$ alkyl group, a $C_{6-10}$ cyclic hydrocarbon group, a phenyl group, a benzyl group, or a phenethyl group; and c is 1 or 2).

Specific examples of a compound (monomer) constituting the structural unit of Formula (4) include monomers such as 1-methoxyethyl(meth)acrylate, 1-ethoxyethyl(meth)acrylate, 1-propoxyethyl(meth)acrylate, 1-isopropoxyethyl(meth)acrylate, 1-n-butoxyethyl(meth)acrylate, 1-tert-butoxyethyl(meth)acrylate, 1-n-hexyloxyethyl(meth)acrylate, 1-cyclohexyloxyethyl(meth)acrylate, and tetrahydro-2H-pyran-2-yl(meth)acrylate. These monomers may be used singly or in combination of two or more of them.

The structural unit of Formula (5) is represented by Formula (5-1) or Formula (5-2), for example. The structural unit of Formula (5) may be a structural unit obtained from the compounds (monomers) exemplified as described below.

(5-1)

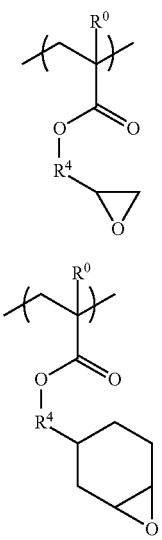

(5-2)

(In Formulae, each of $R^0$s is independently a hydrogen atom or a methyl group, and each of $R^4$s is independently a single bond or a $C_{1-5}$ alkylene group.)

Examples of a compound (monomer) constituting the structural unit of Formula (5) include monomers represented by the formulae below. These monomers may be used singly or in combination of two or more of them.

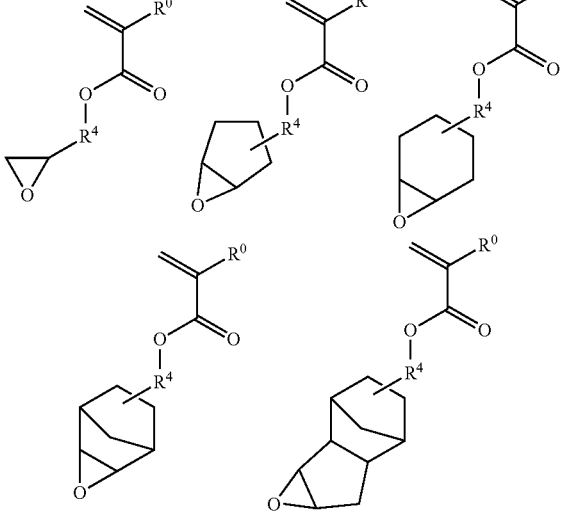

(In Formulae, each of $R^0$s is independently a hydrogen atom or a methyl group, each of $R^4$s is independently a single bond or a $C_{1-5}$ alkylene group.)

More specific examples of a compound (monomer) constituting the structural unit of Formula (5) include glycidyl (meth)acrylate, 3,4-epoxycyclopentylmethyl(meth)acrylate, 3,4-epoxycyclohexylmethyl(meth)acrylate, 5,6-epoxy-2-bicyclo[2.2.1]heptylmethyl (meth)acrylate, and 3,4-epoxytricyclo[5.2.1.0$^{2,6}$]decan-8-yl(meth)acrylate. These monomers may be used singly or in combination of two or more of them.

The copolymer having the structural units of Formula (1), Formula (4), and Formula (5) contains: the structural unit of Formula (1) in an amount of 20% by mol to 90% by mol and preferably of 30% by mol to 80% by mol; the structural unit of Formula (4) in an amount of 5% by mol to 75% by mol and preferably of 10% by mol to 60% by mol; and the structural unit of Formula (5) in an amount of 5% by mol to 75% by mol and preferably of 10% by mol to 60% by mol, with respect to the total amount of 100% by mol of the structural unit of Formula (1), the structural unit of Formula (4), and the structural unit of Formula (5).

The copolymer typically has a weight average molecular weight of 1,000 to 100,000 and preferably 3,000 to 50,000. The weight average molecular weight is a value determined by gel permeation chromatography (GPC) with polystyrene as a standard sample.

The resin composition of the present invention typically contains the copolymer in an amount of 1% by mass to 99% by mass and preferably 5% by mass to 95% by mass, based on the solid content in the resin composition.

In the present invention, the method for preparing the copolymer is not particularly limited, and the copolymer is typically prepared by polymerizing compounds (monomers) constituting the structural units of Formula (1), Formula (2), and Formula (3) or compounds (monomers) constituting the structural units of Formula (1), Formula (4), and Formula (5) and, if desired, a compound (hereinafter, abbreviated as compound X in the present specification) other than the above compounds, in a solvent in the presence of a polymerization initiator typically at a temperature of 50° C. to 120° C. The copolymer prepared in this manner is typically obtained as a solution dissolving the copolymer in a solvent, and the solution may be used for the resin composition of the present invention without isolation.

Alternatively, the copolymer solution obtained as described above may be poured to a poor solvent such as hexane, diethyl ether, methanol, and water, with stirring to reprecipitate the copolymer, and the resulting precipitate may be filtered, washed, and then dried at ambient temperature or by heat at ambient pressure or under reduced pressure, thus affording the copolymer as a powder. Such an operation can remove a polymerization initiator and unreacted compounds coexistent with the copolymer. In the present invention, the copolymer powder may be used without any treatment or the powder may be redissolved in, for example, a solvent described later, thus affording a solution to be used.

Specific examples of the compound X include (meth)acrylic acid, methyl(meth)acrylate, ethyl(meth)acrylate, isopropyl(meth)acrylate, cyclohexyl(meth)acrylate, isobornyl (meth)acrylate, adamantyl(meth)acrylate, dicyclopentanyl (meth)acrylate, dicyclopentenyl(meth)acrylate, dicyclopentenyloxyethyl(meth)acrylate, benzyl(meth)acrylate, γ-butyrolactone(meth)acrylate, indene, maleimide, N-methylmaleimide, N-ethylmaleimide, N-cyclohexylmaleimide, N-phenylmaleimide, N-benzylmaleimide, N-(4-hydroxyphenyl)maleimide, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, 4-hydroxycyclohexyl vinyl ether, 1,4-cyclohexanedimethanol monovinyl ether, diethylene glycol monovinyl ether, and dipropylene glycol monovinyl ether.

The method for preparing the resin composition of the present invention is not particularly limited, and an example of the method is a method of dissolving the copolymer having the structural units of Formula (1), Formula (2), and Formula (3) or the copolymer having the structural units of Formula (1), Formula (4), and Formula (5) in a solvent to afford a homogeneous solution. Another example is a method further including adding another additive, as necessary, and mixing the whole at an appropriate step in the preparation method.

The solvent is not particularly limited as long as the solvent is capable of dissolving the copolymer. Examples of such a solvent include ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, propylene glycol monobutyl ether, propylene glycol monobutyl ether acetate, toluene, xylene, methyl ethyl ketone, cyclopentanone, cyclohexanone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl acetate, butyl acetate, ethyl lactate, butyl lactate, 2-heptanone, and γ-butyrolactone. These solvents may be used singly or in combination of two or more of them.

Among these solvents, propylene glycol monomethyl ether, propylene glycol monomethyl ether acetate, 2-heptanone, ethyl lactate, butyl lactate, and cyclohexanone are preferred from the viewpoint of improving the leveling properties of a coating formed by applying the resin composition of the present invention onto a substrate.

The resin composition of the present invention may also contain a surfactant in order to improve coating properties.

Examples of the surfactant include nonionic surfactants including polyoxyethylene alkyl ethers such as polyoxyethylene lauryl ether, polyoxyethylene stearyl ether, polyoxyethylene cetyl ether, and polyoxyethylene oleyl ether, polyoxyethylene alkylaryl ethers such as polyoxyethylene octylphenyl ether and polyoxyethylene nonylphenyl ether, polyoxyethylene/polyoxypropylene block copolymers, sorbitan fatty acid esters such as sorbitan monolaurate, sorbitan monopalmitate, sorbitan monostearate, sorbitan monooleate, sorbitan trioleate, and sorbitan tristearate, polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate, and polyoxyethylene sorbitan tristearate; fluorochemical surfactants including EFTOP [registered trademark] EF301, EFTOP EF303, EFTOP EF352 (manufactured by Mitsubishi Materials Electronic Chemicals Co., Ltd.), MEGAFAC [registered trademark] F-171, MEGAFAC F-173, MEGAFAC R-30 (manufactured by DIC Corporation), Fluorad FC 430, Fluorad FC431 (manufactured by Sumitomo 3M), Asahiguard [registered trademark] AG710, Surflon [registered trademark] S-382, Surflon SC101, Surflon SC102, Surflon SC103, Surflon SC104, Surflon SC105, Surflon SC106 (manufactured by Asahi Glass Co., Ltd.), and FTERGENT series such as FTX-206D, FTX-212D, FTX-218, FTX-220D, FTX-230D, FTX-240D, FTX-212P, FTX-220P, FTX-228P, FTX-240G (manufactured by Neos Company Ltd.); and organosiloxane polymer KP 341 (manufactured by Shin-Etsu Chemical Co., Ltd.). These surfactants may be used singly or in combination of two or more of them.

When used, the surfactant is contained in the resin composition of the present invention in an amount of 3% by mass or less, preferably 1% by mass or less, and more preferably 0.5% by mass or less based on the solid content of the resin composition.

The resin composition of the present invention may contain additives such as a cross-linking agent, a curing aid, an ultraviolet absorber, a sensitizer, a plasticizer, an antioxidant, and a bonding aid, as necessary, as long as the advantageous effect of the invention is not impaired.

A usage example of the resin composition of the present invention will next be described.

Onto a substrate (for example, a semiconductor substrate such as a silicon coated with a silicon oxide film, a semiconductor substrate such as a silicon coated with a silicon nitride film or a silicon oxynitride film, a silicon nitride substrate, a quartz substrate, a glass substrate (including a non-alkali glass, a low-alkali glass, and a crystallized glass), and a glass substrate with an ITO film formed thereon), the resin composition of the present invention is applied with an appropriate coating means such as a spinner and a coater, and then is baked and cured with a heating means such as a hot plate to thus form a resin layer for a microlens.

The baking condition is appropriately selected from a baking temperature of 80° C. to 300° C. and a baking time of 0.3 minute to 60 minutes. The baking may be performed in two or more stages.

A film formed from the resin composition of the present invention has a film thickness of, for example, 0.001 μm to 100 μm and preferably 0.01 μm to 10 μm.

Next, onto the resin layer for a microlens formed from the resin composition of the present invention, a resist is applied. The resist is exposed through a predetermined mask. Post exposure bake (PEB) is performed, as necessary, and the substrate is subjected to alkali development, rinse, and drying. A predetermined resist pattern is consequently formed. The exposure may be performed with, for example, g-rays, i-rays, a KrF excimer laser, or an ArF excimer laser.

Subsequent heat treatment allows the resist pattern to reflow, thus forming a lens pattern. The lens pattern is used as an etching mask to etch-back the underlayer as the resin layer for a microlens and this transfers the lens pattern shape to the resin layer for a microlens. Thus, a microlens is produced.

EXAMPLES

The present invention will be described in further detail with reference to examples and comparative examples below, but the present invention is not limited to these examples.

[Measurement of Weight Average Molecular Weight of Copolymers Obtained in Synthesis Examples Below]
Apparatus: GPC system manufactured by JASCO Corporation
Column: Shodex [registered trademark] KF-804L and 803L
Column oven: 40° C.
Flow rate: 1 mL/min
Eluent: tetrahydrofuran

[Synthesis of Copolymers]

Synthesis Example 1

In 101.0 g of propylene glycol monomethyl ether acetate, 36.0 g of styrene, 10.5 g of 2-(O-[1'-methylpropylideneamino]carboxyamino)ethyl methacrylate (Karenz [registered trademark] MOI-BM (manufactured by Showa Denko K. K.)), 5.6 g of 2-hydroxyethyl methacrylate, and 2.2 g of 2,2'-azobisisobutyronitrile were dissolved, and then the solution was added over 4 hours dropwise into a flask in which 26.0 g of propylene glycol monomethyl ether acetate was kept at 75° C. After the completion of the dropwise addition, the mixture was reacted for 18 hours to yield a solution of a copolymer having the structural unit of Formula (7) (a solid content concentration of 30% by mass). The obtained copolymer had a weight average molecular weight Mw of 13,000 (in terms of polystyrene).

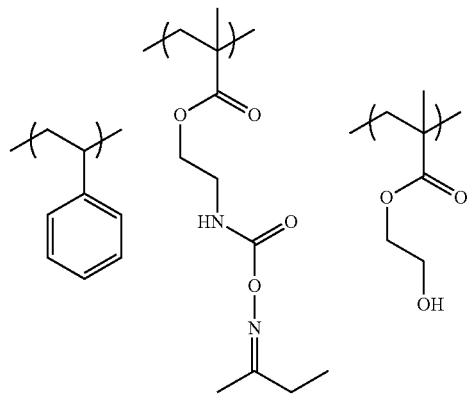

(7)

Synthesis Example 2

In 98.0 g of propylene glycol monomethyl ether acetate, 28.0 g of styrene, 14.5 g of 2-[(3,5-dimethylpyrazolyl) carboxyamino]ethyl methacrylate (Karenz [registered trademark] MOI-BP (manufactured by Showa Denko K. K.)), 8.3 g of 2-hydroxypropyl methacrylate, and 1.9 g of 2,2'-azobisisobutyronitrile were dissolved, and then the solution was added over 4 hours dropwise into a flask in which 25.0 g of propylene glycol monomethyl ether acetate was kept at 75° C. After the completion of the dropwise addition, the mixture was reacted for 18 hours to yield a solution of a copolymer having the structural unit of Formula (8) (a solid content concentration of 30% by mass). The obtained copolymer had a weight average molecular weight Mw of 15,000 (in terms of polystyrene).

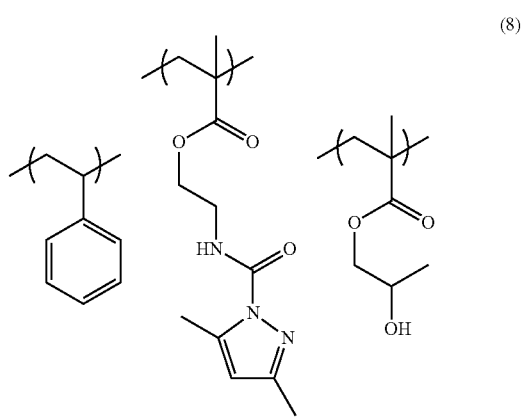

(8)

Synthesis Example 3

In 99.0 g of propylene glycol monomethyl ether, 22.0 g of styrene, 17.1 g of 2-(O-[1'-methylpropylideneamino]carboxyamino)ethyl methacrylate (Karenz [registered trademark] MOI-BM (manufactured by Showa Denko K. K.)), 12.5 g of 4-hydroxyphenyl methacrylate, and 1.7 g of 2,2'-azobisisobutyronitrile were dissolved, and then the solution was added over 4 hours dropwise into a flask in which 25.4 g of propylene glycol monomethyl ether was kept at 75° C. After the completion of the dropwise addition, the mixture was reacted for 18 hours to yield a solution of a copolymer having the structural unit of Formula (9) (a solid content concentration of 30% by mass). The obtained copolymer had a weight average molecular weight Mw of 15,000 (in terms of polystyrene).

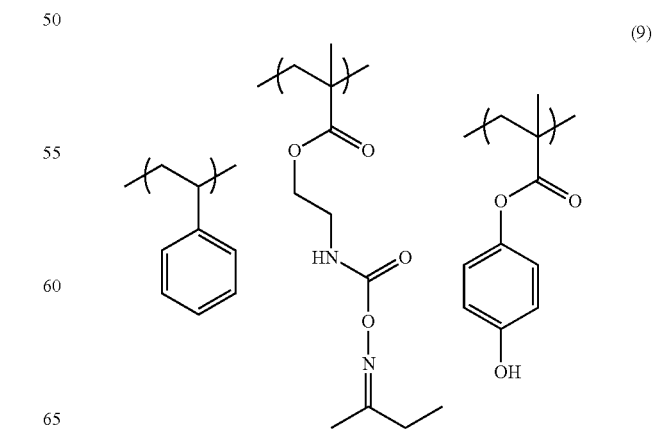

(9)

Synthesis Example 4

In 104.0 g of propylene glycol monomethyl ether, 23.0 g of styrene, 17.8 g of 2-(O-[1'-methylpropylideneamino]carboxyamino)ethyl methacrylate (Karenz [registered trademark] MOI-BM (manufactured by Showa Denko K. K.)), 13.0 g of N-(4-hydroxyphenyl)methacrylamide, and 2.1 g of 2,2'-azobisisobutyronitrile were dissolved, and then the solution was added over 4 hours dropwise into a flask in which 26.7 g of propylene glycol monomethyl ether was kept at 75° C. After the completion of the dropwise addition, the mixture was reacted for 18 hours to yield a solution of a copolymer having the structural unit of Formula (10) (a solid content concentration of 30% by mass). The obtained copolymer had a weight average molecular weight Mw of 13,000 (in terms of polystyrene).

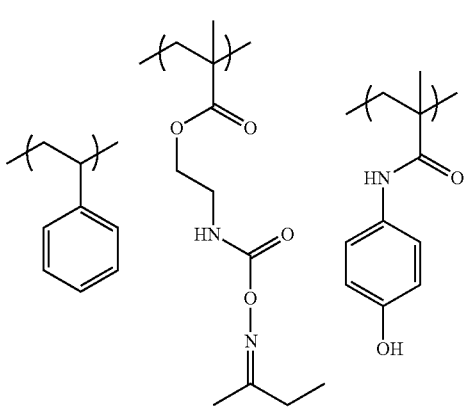

(10)

Synthesis Example 5

In 103.0 g of propylene glycol monomethyl ether acetate, 38.0 g of styrene, 8.5 g of 1-n-butoxyethyl methacrylate, 6.5 g of glycidyl methacrylate, and 2.3 g of 2,2'-azobisisobutyronitrile were dissolved, and then the solution was added over 4 hours dropwise into a flask in which 26.0 g of propylene glycol monomethyl ether acetate was kept at 75° C. After the completion of the dropwise addition, the mixture was reacted for 18 hours to yield a solution of a copolymer having the structural unit of Formula (11) (a solid content concentration of 30% by mass). The obtained copolymer had a weight average molecular weight Mw of 14,000 (in terms of polystyrene).

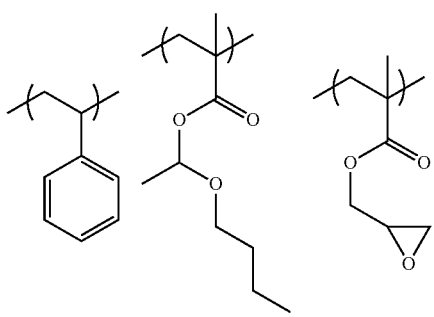

(11)

Synthesis Example 6

In 102.0 g of propylene glycol monomethyl ether acetate, 30.0 g of styrene, 10.5 g of tetrahydro-2H-pyran-2-yl methacrylate, 12.1 g of 3,4-epoxycyclohexylmethyl methacrylate (Cyclomer [registered trademark] M100 (manufactured by Daicel Chemical Industries, Ltd.)), and 2.0 g of 2,2'-azobisisobutyronitrile were dissolved, and then the solution was added over 4 hours dropwise into a flask in which 26.0 g of propylene glycol monomethyl ether acetate was kept at 75° C. After the completion of the dropwise addition, the mixture was reacted for 18 hours to yield a solution of a copolymer having the structural unit of Formula (12) (a solid content concentration of 30% by mass). The obtained copolymer had a weight average molecular weight Mw of 13,000 (in terms of polystyrene).

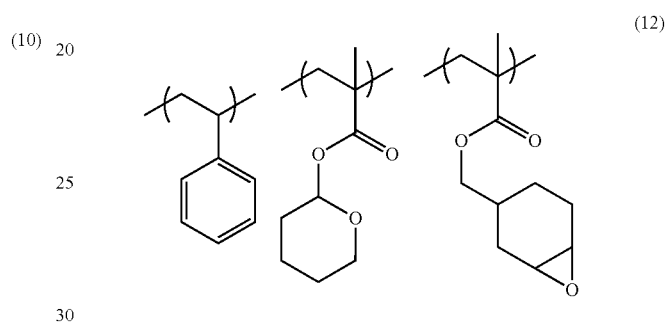

(12)

Synthesis Example 7

In 92.0 g of propylene glycol monomethyl ether, 36.0 g of styrene, 11.2 g of 2-hydroxyethyl methacrylate, and 2.1 g of 2,2'-azobisisobutyronitrile were dissolved, and then the solution was added over 4 hours dropwise into a flask in which 24.0 g of propylene glycol monomethyl ether was kept at 75° C. After the completion of the dropwise addition, the mixture was reacted for 18 hours to yield a solution of a copolymer having the structural unit of Formula (13) (a solid content concentration of 30% by mass). The obtained copolymer had a weight average molecular weight Mw of 13,000 (in terms of polystyrene).

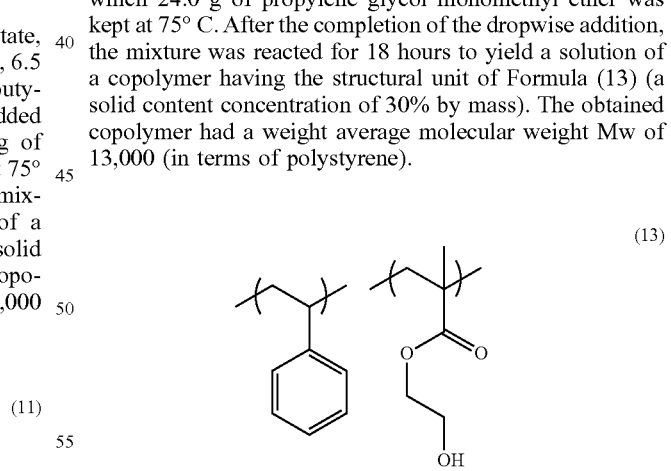

(13)

Synthesis Example 8

In 100.0 g of propylene glycol monomethyl ether acetate, 26.0 g of styrene, 25.9 g of 2-(O-[1'-methylpropylideneamino]carboxyamino)ethyl methacrylate (Karenz [registered trademark] MOI-BM (manufactured by Showa Denko K. K.)), and 1.8 g of 2,2'-azobisisobutyronitrile were dissolved, and then the solution was added over 4 hours dropwise into a flask in which 25.6 g of propylene glycol monomethyl ether acetate was kept at 75° C. After the completion of the dropwise addition, the mixture was reacted for 18 hours to yield a solution of a copolymer having the structural unit of Formula (14) (a solid content concentration of 30% by mass). The obtained copolymer had a weight average molecular weight Mw of 12,000 (in terms of polystyrene).

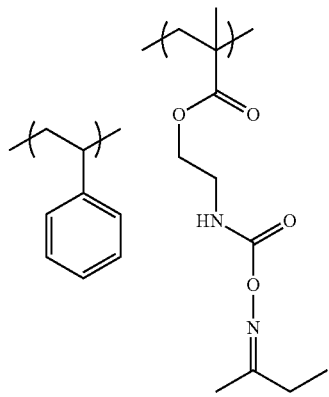

(14)

Synthesis Example 9

In 102.2 g of propylene glycol monomethyl ether acetate, 30.0 g of styrene, 23.0 g of 1-n-butoxyethyl methacrylate, and 2.0 g of 2,2'-azobisisobutyronitrile were dissolved, and then the solution was added over 4 hours dropwise into a flask in which 26.2 g of propylene glycol monomethyl ether acetate was kept at 75° C. After the completion of the dropwise addition, the mixture was reacted for 18 hours to yield a solution of a copolymer having the structural unit of Formula (15) (a solid content concentration of 30% by mass). The obtained copolymer had a weight average molecular weight Mw of 11,000 (in terms of polystyrene).

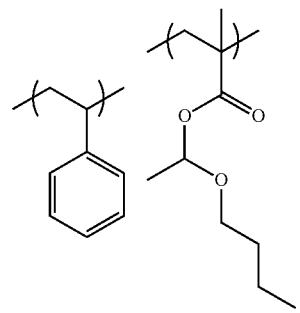

(15)

Synthesis Example 10

In 101.3 g of propylene glycol monomethyl ether acetate, 33.0 g of styrene, 19.3 g of glycidyl methacrylate, and 2.2 g of 2,2'-azobisisobutyronitrile were dissolved, and then the solution was added over 4 hours dropwise into a flask in which 26.0 g of propylene glycol monomethyl ether acetate was kept at 75° C. After the completion of the dropwise addition, the mixture was reacted for 18 hours to yield a solution of a copolymer having the structural unit of Formula (16) (a solid content concentration of 30% by mass).

The obtained copolymer had a weight average molecular weight Mw of 10,000 (in terms of polystyrene).

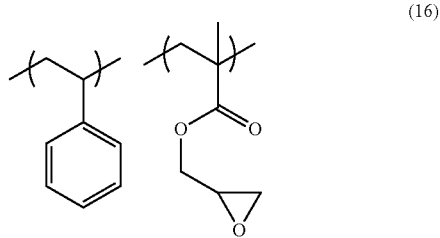

(16)

[Preparation of Resin Compositions]

Example 1

In 15.0 g of propylene glycol monomethyl ether, 50.0 g of the copolymer solution obtained in Synthesis Example 1 and 0.03 g of MEGAFAC [registered trademark] R-30 (manufactured by DIC Corporation) as a surfactant were dissolved to obtain a solution. The solution was then filtered through a polyethylene microfilter having a pore size of 0.10 μm to prepare a resin composition.

Example 2

In 15.0 g of propylene glycol monomethyl ether, 50.0 g of the copolymer solution obtained in Synthesis Example 2 and 0.03 g of MEGAFAC [registered trademark] R-30 (manufactured by DIC Corporation) as a surfactant were dissolved to obtain a solution. The solution was then filtered through a polyethylene microfilter having a pore size of 0.10 μm to prepare a resin composition.

Example 3

In 15.0 g of propylene glycol monomethyl ether acetate, 50.0 g of the copolymer solution obtained in Synthesis Example 3 and 0.03 g of MEGAFAC [registered trademark] R-30 (manufactured by DIC Corporation) as a surfactant were dissolved to obtain a solution. The solution was then filtered through a polyethylene microfilter having a pore size of 0.10 μm to prepare a resin composition.

Example 4

In 15.0 g of propylene glycol monomethyl ether acetate, 50.0 g of the copolymer solution obtained in Synthesis Example 4 and 0.03 g of MEGAFAC [registered trademark] R-30 (manufactured by DIC Corporation) as a surfactant were dissolved to obtain a solution. The solution was then filtered through a polyethylene microfilter having a pore size of 0.10 μm to prepare a resin composition.

Example 5

In 15.0 g of propylene glycol monomethyl ether, 50.0 g of the copolymer solution obtained in Synthesis Example 5 and 0.03 g of MEGAFAC [registered trademark] R-30 (manufactured by DIC Corporation) as a surfactant were dissolved to obtain a solution. The solution was then filtered through a polyethylene microfilter having a pore size of 0.10 μm to prepare a resin composition.

Example 6

In 15.0 g of propylene glycol monomethyl ether, 50.0 g of the copolymer solution obtained in Synthesis Example 6 and 0.03 g of MEGAFAC [registered trademark] R-30 (manufactured by DIC Corporation) as a surfactant were dissolved to obtain a solution. The solution was then filtered through a polyethylene microfilter having a pore size of 0.10 μm to prepare a resin composition.

Example 7

In 15.0 g of propylene glycol monomethyl ether, 50.0 g of the copolymer solution obtained in Synthesis Example 1, 0.03 g of MEGAFAC [registered trademark] R-30 (manufactured by DIC Corporation) as a surfactant, and 0.75 g of Nikalac [registered trademark] MW-390 (manufactured by SANWA Chemical Co., Ltd.) as a cross-linking agent were dissolved to obtain a solution. The solution was then filtered through a polyethylene microfilter having a pore size of 0.10 μm to prepare a resin composition.

Example 8

A resin composition was prepared in the same condition as in Example 7 except that 0.75 g of Epolead [registered trademark] GT-401 (manufactured by Daicel Chemical Industries, Ltd.) was used as the cross-linking agent in place of Nikalac [registered trademark] MW-390.

Example 9

A resin composition was prepared in the same condition as in Example 7 except that 0.75 g of VESTANAT [registered trademark] B1358/100 (manufactured by Evonik Degussa Japan Co., Ltd.) was used as the cross-linking agent in place of Nikalac [registered trademark] MW-390.

Comparative Example 1

In 1.1 g of propylene glycol monomethyl ether and 9.0 g of propylene glycol monomethyl ether acetate, 50.0 g of the copolymer solution obtained in Synthesis Example 7 and 0.03 g of MEGAFAC [registered trademark] R-30 (manufactured by DIC Corporation) as a surfactant were dissolved to obtain a solution. The solution was then filtered through a polyethylene microfilter having a pore size of 0.10 μm to prepare a resin composition.

Comparative Example 2

In 3.6 g of propylene glycol monomethyl ether acetate, 50.0 g of the copolymer solution obtained in Synthesis Example 8 and 0.03 g of MEGAFAC [registered trademark] R-30 (manufactured by DIC Corporation) as a surfactant were dissolved to obtain a solution. The solution was then filtered through a polyethylene microfilter having a pore size of 0.10 μm to prepare a resin composition.

Comparative Example 3

In 50.0 g of the copolymer solution obtained in Synthesis Example 9, 0.03 g of MEGAFAC [registered trademark] R-30 (manufactured by DIC Corporation) was dissolved as a surfactant to obtain a solution. The solution was then filtered through a polyethylene microfilter having a pore size of 0.10 μm to prepare a resin composition.

Comparative Example 4

In 50.0 g of the copolymer solution obtained in Synthesis Example 10, 0.03 g of MEGAFAC [registered trademark] R-30 (manufactured by DIC Corporation) was dissolved as a surfactant to obtain a solution. The solution was then filtered through a polyethylene microfilter having a pore size of 0.10 μm to prepare a resin composition.

[Solvent Resistance Test]

Each resin composition prepared in Example 1 to Example 9 and Comparative Example 1 to Comparative Example 4 was applied onto a silicon wafer with a spin coater and baked on a hot plate at 100° C. for 1 minute and then at 230° C. for 5 minutes, thus yielding a film having a film thickness of 2 μm. Each film was immersed in propylene glycol monomethyl ether, propylene glycol monomethyl ether acetate, ethyl lactate, butyl acetate, methyl 3-methoxypropionate, acetone, methyl isobutyl ketone, 2-heptanone, 2-propanol, and 2.38% by mass aqueous tetramethylammonium hydroxide (TMAH) solution under a temperature condition at 23° C. for 10 minutes. Change in film thickness of each film before and after the immersion test was measured, and the solvent resistance was evaluated as follows: a film having a thickness increase/decrease of 5% or more relative to the film thickness before the immersion with at least one of the immersion solvents was evaluated as "×"; and a film having a thickness increase/decrease of less than 5% after the immersion with each of all the solvents was evaluated as "○." Table 1 shows the evaluation results.

[Measurement of Transmittance]

Each resin composition prepared in Example 1 to Example 9 was applied onto a quartz substrate with a spin coater and baked on a hot plate at 100° C. for 1 minute and then at 230° C. for 5 minutes, thus yielding a film having a film thickness of 2 μm. The transmittance of each film was measured at a wavelength of 400 nm with an ultraviolet-visible spectrophotometer UV-2550 (manufactured by Shimadzu Corporation). The film was further heated at 260° C. for 5 minutes and then the transmittance of the film was measured at a wavelength 400 nm. Table 1 shows the evaluation results.

[Measurement of Dry Etching Rate]

The dry etching rate was measured with an etcher and an etching gas shown below.

Etcher: RIE-10NR (manufactured by Samco Inc.)
Etching gas: $CF_4$

Each resin composition prepared in Example 1 to Example 9 was applied onto a silicon wafer with a spin coater and baked on a hot plate at 100° C. for 1 minute and then at 230° C. for 5 minutes, thus yielding a film having a film thickness of 2 μm. The dry etching rate of each film was measured with the etcher and the etching gas. In a similar manner, a resist solution (THMR-iP1800 (manufactured by Tokyo Ohka Kogyo Co., Ltd.) was applied onto a silicon wafer with a spin coater and baked on a hot plate at 90° C. for 1.5 minutes, then at 110° C. for 1.5 minutes, and further at 180° C. for 1 minute, thus yielding a resist film having a film thickness of 1 μm. The dry etching rate of the resist film was determined Next, the ratio of the dry etching rate of the film obtained from each resin composition prepared in Example 1 to Example 9 with respect to that of the resist film was calculated. Table 1 shows the evaluation results.

[Storage Stability]

Each resin composition prepared in Example 1 to Example 9 was stored at 35° C. (accelerated test) for three weeks. A resin composition having a viscosity change of less than 10% relative to the viscosity immediately after the preparation was evaluated as "○", and a resin composition having a viscosity change of 10% or more was evaluated as "x." Table 1 shows the evaluation results.

[Level Difference Planarization Performance]

Each resin composition prepared in Example 1 to Example 9 was applied onto a substrate having a level difference with a height of 0.5 μm, a line width of 30 μm, and a space between lines of 30 μm with a spin coater and baked on a hot plate at 100° C. for 1 minute and then at 230° C. for 5 minutes, thus yielding a film having a film thickness of 2 μm. From h1 (the level difference of the substrate with a level difference) and h2 (the film thickness difference of the cured film) shown in FIG. 1, the planarization ratio was calculated in accordance with "Equation: $(1-(h2/h1))\times 100$." Table 1 shows the evaluation results.

the film formed from each resin composition prepared in Example 1, Example 2, and Example 5 to Example 9 had excellent level difference planarization performance of a planarization ratio of 80% or more. In contrast, the results reveal that the film formed from each resin composition prepared in Comparative Example 1 to Comparative Example 4 had unsatisfactory solvent resistance and was not suitable for a microlens or a planarizing film.

DESCRIPTION OF THE REFERENCE NUMERALS

1: substrate with a level difference
2: cured film
3: line width
4: space between lines
h1: level difference of a substrate with a level difference
h2: film thickness difference of a cured film

TABLE 1

| | Solvent resistance | Transmittance/% (400 nm) 230° C. | Transmittance/% (400 nm) 260° C. | Ratio of dry etching rate (to resist) | Storage stability | Planarization ratio |
|---|---|---|---|---|---|---|
| Example 1 | ○ | 100 | 100 | 1.0 | ○ | 89% |
| Example 2 | ○ | 100 | 100 | 1.1 | ○ | 87% |
| Example 3 | ○ | 100 | 100 | 1.1 | ○ | 55% |
| Example 4 | ○ | 100 | 100 | 1.1 | ○ | 54% |
| Example 5 | ○ | 100 | 100 | 1.0 | ○ | 88% |
| Example 6 | ○ | 100 | 100 | 1.1 | ○ | 83% |
| Example 7 | ○ | 100 | 100 | 1.1 | ○ | 87% |
| Example 8 | ○ | 100 | 100 | 1.1 | ○ | 88% |
| Example 9 | ○ | 100 | 100 | 1.1 | ○ | 88% |
| Comparative Example 1 | X | — | — | — | — | — |
| Comparative Example 2 | X | — | — | — | — | — |
| Comparative Example 3 | X | — | — | — | — | — |
| Comparative Example 4 | X | — | — | — | — | — |

The results in Table 1 reveal that the film formed from the resin composition of the present invention had high solvent resistance and high transparency as well as such high heat resistance that the film was not colored even after heating at 260° C. In the etch back method, for the accurate transfer of a lens pattern shape to a resin layer for a microlens as the underlayer, a dry etching rate X of the resist and a dry etching rate Y of the resin layer for a microlens are required to be substantially equal (X:Y=1:0.8 to 1.2). The results reveal that the resin composition of the present invention satisfies the requirement. The resin composition of the present invention was also found to have excellent storage stability. The film formed from each resin composition of the present invention had level difference planarization performance of a planarization ratio of 50% or more. Among them,

The invention claimed is:

1. A resin composition comprising:
   a copolymer having structural units of (i) Formula (1), (ii) Formula (2-1), (iii) Formula (3-1), and (iv) optionally Formula (2-2):

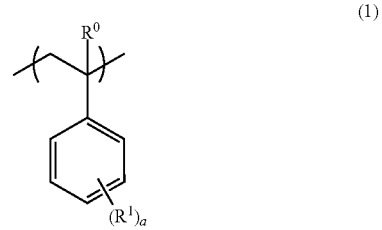

-continued

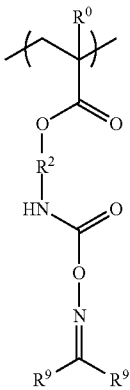
(2-1)

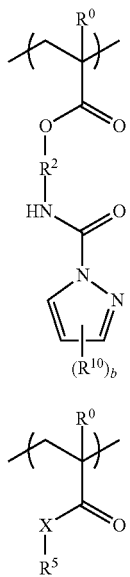
(2-2)

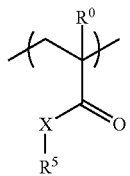
(3-1)

where:
each $R^0$ is independently a hydrogen atom or a methyl group;
$R^1$ is a $C_{1-10}$ alkyl group, a cyano group, a carboxy group, a phenyl group, or a halogeno group;
a is an integer of 0 to 5;
$R^2$ is a $C_2$ alkylene group;
X is an —O— group;
$R^5$ is a 2-hydroxyethyl group; and
one of $R^9$ is a methyl group, the other of $R^9$ is an ethyl group;
$R^{10}$ is a methyl group; and
b is an integer of 0 to 3; and
a solvent;
wherein the copolymer does not have structural units other than the structural units of Formula (1), Formula (2-1), Formula (2-2), and Formula (3-1),
the copolymer contains: the structural unit of Formula (1) in an amount of 30% by mol to 80% by mol; the structural unit of Formula (2-1) and Formula (2-2), when present, in an amount of 10% by mol to 60% by mol; and the structural unit of Formula (3-1) in an amount of 10% by mol to 60% by mol, with respect to the total amount of 100% by mol of the structural unit of Formula (1), the structural unit of Formula (2-1), the structural unit of Formula (2-2), and the structural unit of Formula (3-1).

2. The resin composition according to claim 1, wherein the copolymer has a weight average molecular weight of 1,000 to 100,000.

3. A planarizing film produced from the resin composition as claimed in claim 1.

4. The resin composition according to claim 1, where the copolymer includes structural units of Formula (7):

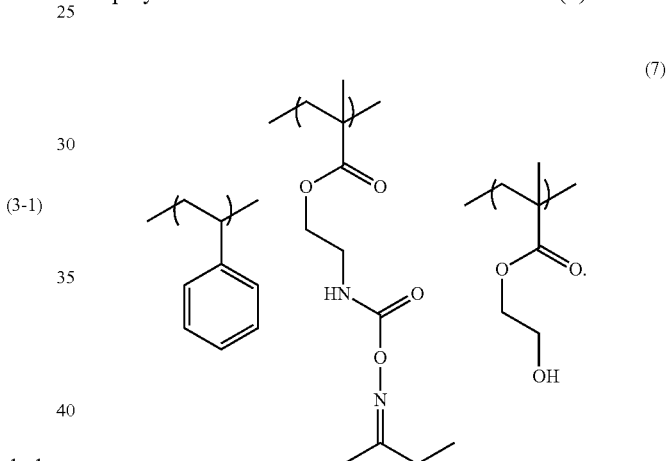
(7)

5. The resin composition according to claim 1, wherein the resin composition is for a planarizing film.

6. The resin composition according to claim 1, wherein the copolymer is a terpolymer.

7. The resin composition according to claim 1, where the copolymer includes structural units of Formula (2-2).

* * * * *